(12) United States Patent
Comeaux et al.

(10) Patent No.: US 7,975,983 B2
(45) Date of Patent: Jul. 12, 2011

(54) SYSTEM, METHOD AND APPARATUS FOR SPLIT GATE VALVE WITH MECHANICALLY ISOLATED SEAL SURFACES

(75) Inventors: David D. Comeaux, Houston, TX (US); Robert K. Law, Richmond, TX (US); Anton J. Dach, Jr., Trinity, TX (US)

(73) Assignee: Vetco Gray Inc., Houston, TX (US)

( * ) Notice: Subject to any disclaimer, the term of this patent is extended or adjusted under 35 U.S.C. 154(b) by 403 days.

(21) Appl. No.: 12/193,872

(22) Filed: Aug. 19, 2008

(65) Prior Publication Data

US 2010/0044611 A1    Feb. 25, 2010

(51) Int. Cl.
*F16K 25/00* (2006.01)
(52) U.S. Cl. .................. 251/203; 251/193; 251/196
(58) Field of Classification Search .......... 251/193, 251/203, 204, 195, 196, 326
See application file for complete search history.

(56) References Cited

U.S. PATENT DOCUMENTS

| | | | | |
|---|---|---|---|---|
| 2,855,175 A | * | 10/1958 | Dunbar | 251/196 |
| 2,866,253 A | * | 12/1958 | Wynn | 251/196 |
| 3,036,813 A | * | 5/1962 | Lee | 251/196 |
| 3,368,792 A | * | 2/1968 | Siegfried | 251/158 |
| 3,823,911 A | * | 7/1974 | Natho et al. | 251/167 |
| 5,722,636 A | * | 3/1998 | Houston | 251/167 |

OTHER PUBLICATIONS

Graygate Skirted Spring Expander, Gray Tool Company, Drawing No. C-64962.
Graygate Gate Segment Assembly Double Wedge, Drawing No. B 63358, Nov. 1973.
Graygate Double Wedge Expander, Drawing No. 64971, Aug. 1972.

* cited by examiner

*Primary Examiner* — John K Fristoe, Jr.
(74) *Attorney, Agent, or Firm* — Bracewell & Giuliani LLP

(57) ABSTRACT

A split gate is movably mounted within a valve body along a valve axis between valve seats. The split gate has gates, each extending between one of the valve seats and the other gate. In an open position, gate holes register with a fluid aperture and the valve seats to permit fluid flow. In the closed position, the holes do not register with the fluid aperture to prevent fluid flow. The split gate valve also has a gate guide located in the body for moving the gates with respect to the valve seats along the fluid axis. The gate guide forces the pair of gates apart along the fluid axis and into contact with the valve seats in both the open and closed positions. The gates have axial play along the fluid axis when the split gate is between the open and closed positions.

25 Claims, 6 Drawing Sheets

SYSTEM, METHOD AND APPARATUS FOR SPLIT GATE VALVE WITH MECHANICALLY ISOLATED SEAL SURFACES

BACKGROUND OF THE INVENTION

1. Technical Field

The present invention relates in general to valves for controlling fluid flow and, in particular, to an improved system, method and apparatus for a split gate valve having mechanically-isolated seal surfaces.

2. Description of the Related Art

Gate valves with split closure mechanisms offer very economical, low torque options for some valve applications. Due to the inherent need for the gates to "float" within the body cavity, however, they have limited effectiveness in abrasive (e.g., sandy) environments, and/or during fracturing well services. The clearance tolerances that are built into split closure designs to facilitate the float for a bidirectional seal ability serve to work against the needed function of excluding the hard particles found in abrasive and fracturing operations from entering the internal components of the valve design.

One type of gate valve design that is not reliant on flow line pressure to maintain contact between the gates and the valve seats both upstream and downstream simultaneously is known as a "wedge style" gate valve. This configuration has been utilized by the industry as a reliable style for lower pressure fracture service applications. In a wedge style gate valve, the ramping together of both gate segments creates the mechanical load needed to seal against the line pressures. This mechanical seal is beneficial in both the open and closed positions for reducing the ingress of fractured aggregates during well workovers. However, a negative effect of the "wedging" feature is the extremely high torque that is needed to open and close the valves. The high torque requirements limit wedge style gate valves to small valve sizes and line pressures. In addition, hydraulic force is required to actuate the valve since manual force is insufficient. Thus, an improved wedge style gate valve design that overcomes the limitations of previous designs would be desirable.

SUMMARY OF THE INVENTION

Embodiments of a system, method, and apparatus for a split wedge gate valve having mechanically-isolated seal surfaces are disclosed. The invention captures the advantages of the split gate concept, and enhances its ability to stand up to abrasive service by mechanically isolating the sensitive seal surfaces of the components of the valve in both the open and closed positions while maintaining the capability of bidirectional functionality.

In one embodiment, the split gate valve comprises a body having a fluid aperture extending therethrough along a fluid axis, and a valve axis perpendicular to the fluid axis. A pair of valve seats are mounted in the body along the fluid axis and on opposite sides of the valve axis.

A split gate is movably mounted within the body along the valve axis between the valve seats. The split gate has a pair of gates, each of which has a hole. The split gate is movable between an open position wherein the holes register with the fluid aperture and valve seats to permit fluid flow therethrough, and a closed position wherein the holes do not register with the fluid aperture and valve seats to prevent fluid flow therethrough. A hand wheel and stem are mounted to the body and extend along, are rotatable about the valve axis, and are coupled to the split gate for manually moving the split gate between the open and closed positions.

The split gate valve also has a gate guide located in the body and in contact with the split gate for moving the pair of gates with respect to the valve seats along the fluid axis. The gate guide forces the pair of gates apart along the fluid axis and into contact with the valve seats in both the open and closed positions. The gates have axial play along the fluid axis when the split gate is between the open and closed positions.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-6, embodiments of a system, method and apparatus for a split gate valve having mechanically-isolated seal surfaces are disclosed. The invention is well suited for applications that are subject to abrasive service since the sensitive seal surfaces of the split gates and valve seats are mechanically isolated from each other as the gate is moving between the open and closed positions.

Figure 1:
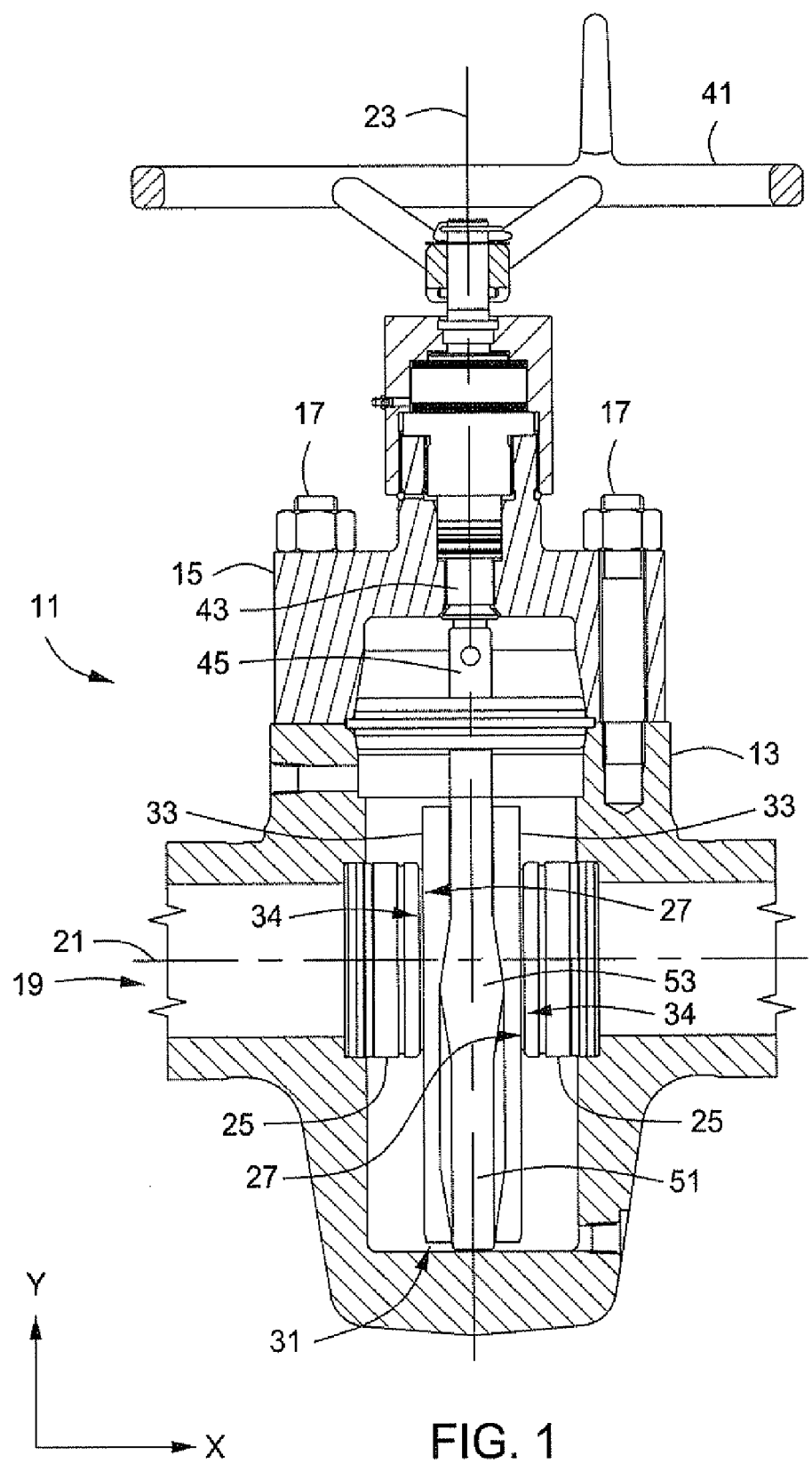
FIG. 1 is a sectional side view of one embodiment of a gate valve, shown with the gate in the closed position, and is constructed in accordance with the invention.
Figure 2:
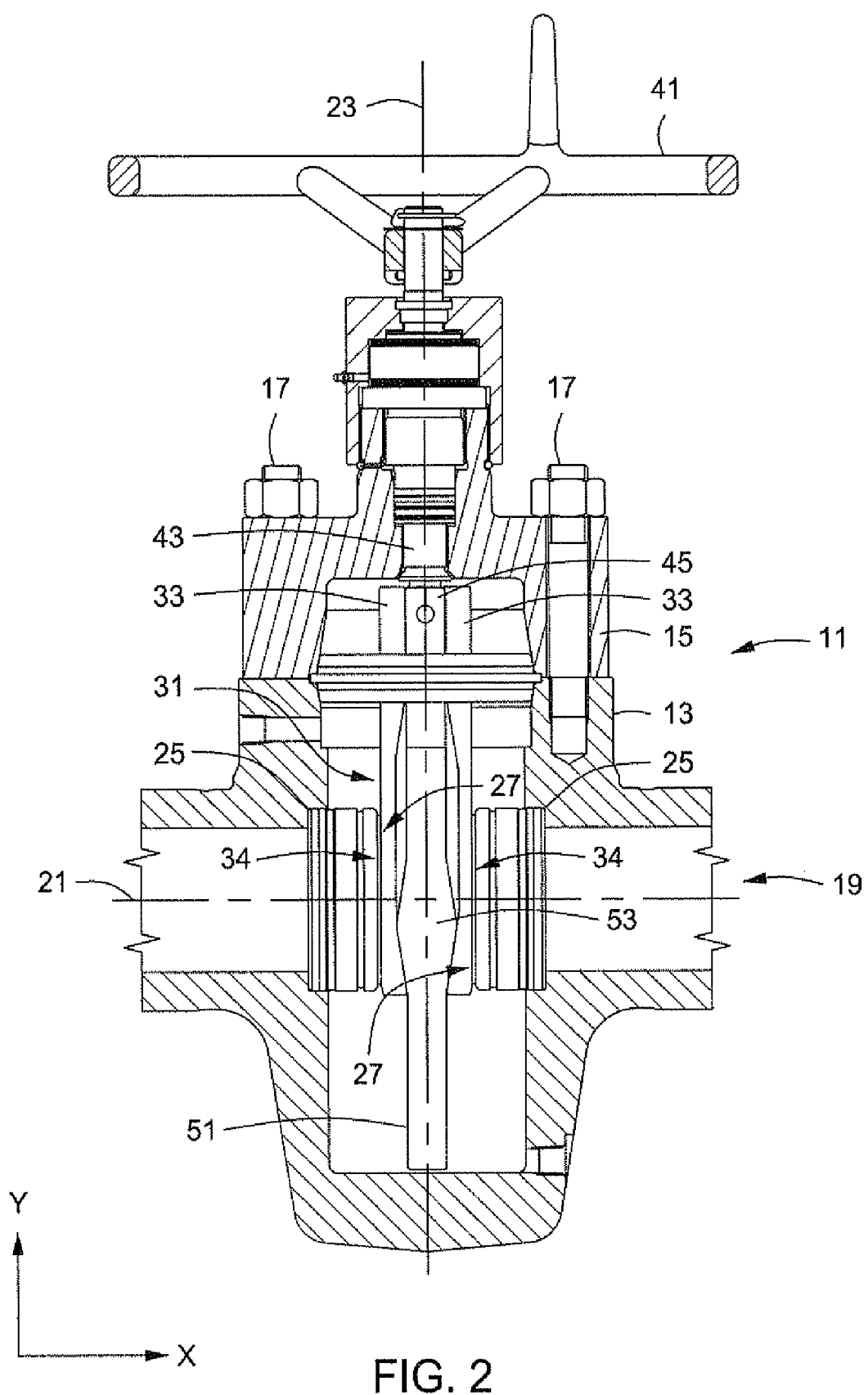
FIG. 2 is a sectional side view of the gate valve of FIG. 1, shown with the gate in the open position, and is constructed in accordance with the invention.

For example, in one embodiment the split gate valve comprises a valve body 11 having a lower portion or body 13 and a cap 15 that are joined with bolts 17 and sealed to each other. The body 11 has a fluid aperture 19 that extends through the lower body 13 along a longitudinal fluid axis 21 (or x-direction). A valve axis 23 extends in a y-direction and is perpendicular or transverse to the fluid axis 21. A pair of valve seats 25 is mounted in the lower body 13 along the fluid axis 21. The valve seats 25 are located on opposite sides of the valve axis 23 and have seal surfaces 27. As shown in FIGS. 1 and 2, the valve seats 25 may be pressed into seat pockets in the lower body 13 on opposite sides of the split gate 31.

The split gate 31 is movably mounted within the body 11 along the valve axis 23 between the valve seats 25. The split gate comprises a pair of opposite facing gates 33. Each gate 33 has a seal surface 34 for engaging a respective one of the seal surfaces 27 of the valve seats 25 to form metal-to-metal seals.

Each gate 33 has a hole 35 and a seal surface 27. The split gate 31 is movable between an open position (see, e.g., FIGS. 2 and 6) wherein the holes 35 register with the fluid aperture 19 and valve seats 27 to permit fluid flow therethrough. In a closed position (see, e.g., FIGS. 1 and 4), the holes 35 do not register with the fluid aperture 19 and the valve seats 27 to prevent fluid flow therethrough.

In one embodiment (FIG. 4), a silt barrier 36 (e.g., a tubular member or sleeve) is located and extends coaxially with holes 35 between the gates 33 to isolate the bore from the valve cavity. Thus, each gate 33 extends between its respective valve seat 25 and the silt barrier 36 located between the gates. Silt barrier 36 is particularly advantageous during fracturing operations to avoid accumulation of debris in the valve cavity between gates 33.

A hand wheel 41 and a stem 43 are mounted to the body 11, and extend along and are rotatable about the valve axis 23. The stem 43 is coupled via a stem block 45 to the split gate 31 for manually moving the split gate 31 between the open and closed positions as is known by those of ordinary skill in the art.

The invention also comprises a gate guide 51 that is located in the body and in contact with the split gate 31. The gate guide 51 moves the pair of gates 33 with respect to the valve seats 25 along the fluid axis 21. The gate guide 51 forces the pair of gates 33 apart along the fluid axis 21 and into contact with the valve seats 25 in both the open and closed positions. The pair of gates 33 has axial play along the fluid axis 21 when the split gate 31 is between the open and closed positions.

Figure 3:
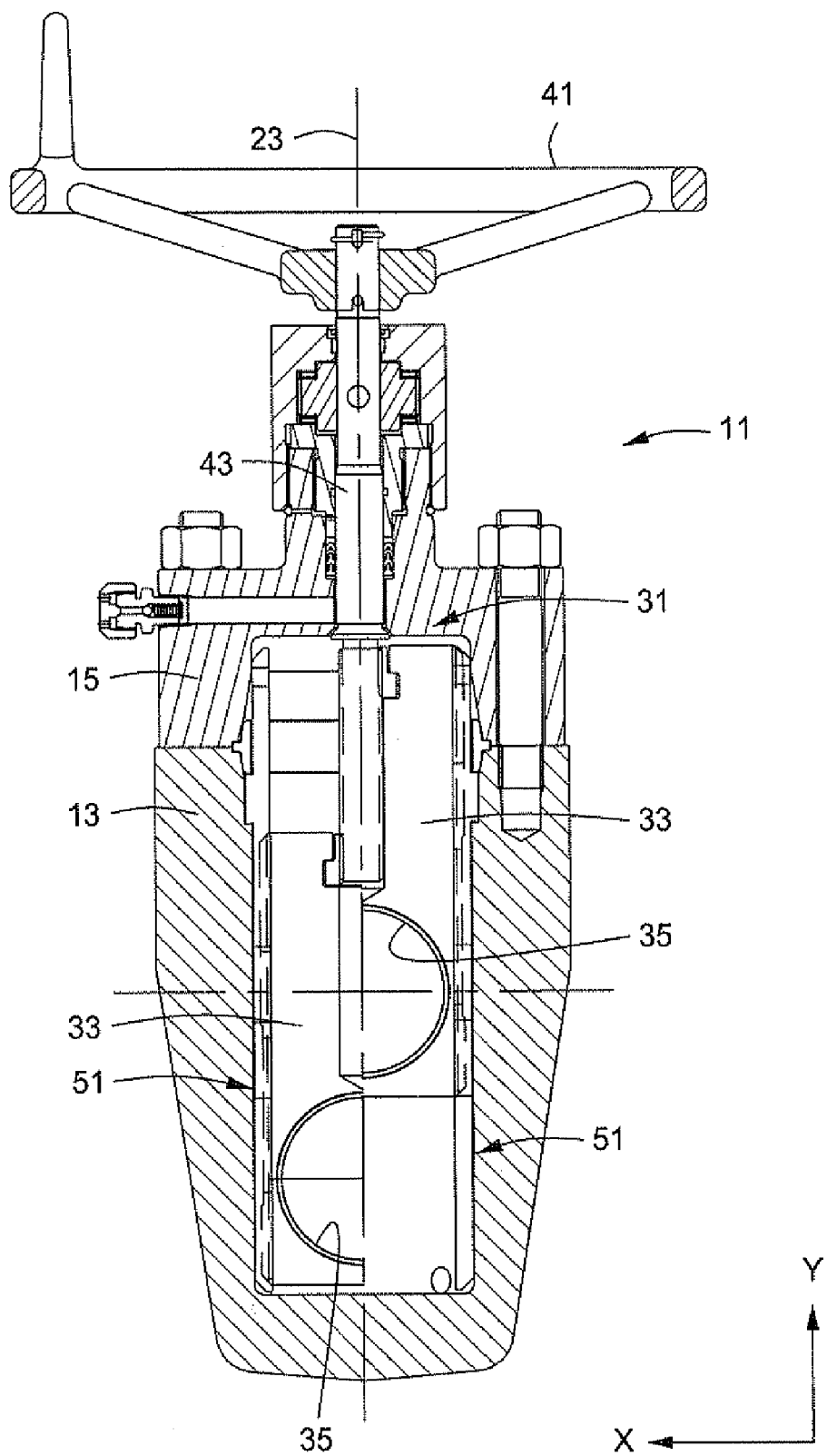
FIG. 3 is a split-sectional end view of the gate valve of FIG. 1, shown with the left side of the gate in the closed position and the right side of the gate in the open position, and is constructed in accordance with the invention.

In some embodiments, the gate guide 51 comprises a pair of gate guides, each located along a lateral side of the split gate 31. As best shown in FIG. 3, the gate guides 51 are laterally spaced apart (i.e., in the z-direction) from both the fluid axis and the valve axis. In the embodiment shown, the gate guides 51 are stationary within the body 11 and may comprise substantially flat, rectangular members, each having a single biasing member 53 (FIGS. 4-6) for engaging the pair of gates. The single biasing member 53 may be configured with four tapers 55 (FIG. 5) to engage each of the pair of gates 33 in both the open and closed positions. The tapers 55 combine to form upward and downward angled tapers to limit travel of the split gate 31 in a direction of the valve axis 23.

In one embodiment, the gate guide 51 has an open stop 57 (FIG. 6) for limiting motion of the split gate 31 along the valve axis 23 (FIGS. 1 and 2) at the open position. A closed stop 59 (FIG. 4) limits motion of the split gate 31 along the valve axis 23 at the closed position. The open stop 57 may comprise a shoulder located between the split gate 31 and the cap 15 or hand wheel 41. Either the open or closed stops 57, 59 may comprise a finger that protrudes laterally inward toward the valve axis 23 between the split gate 31 and the body 11.

In the embodiments shown the split gate 31 has lateral sides 61 (FIGS. 4-6) located adjacent the body 11 and laterally spaced apart from both the fluid axis 21 and the valve axis 23. A recess 63 may be formed in the lateral side 61 of the split gate (or each gate 33) for receiving the gate guide 51 as shown. The recess 63 comprises a generally hexagonal track or slot that extends in a direction of the valve axis 23, and permits the gates 33 to have some axial play along the fluid axis 21 when the split gate 31 is between the open and closed positions.

Figure 4:
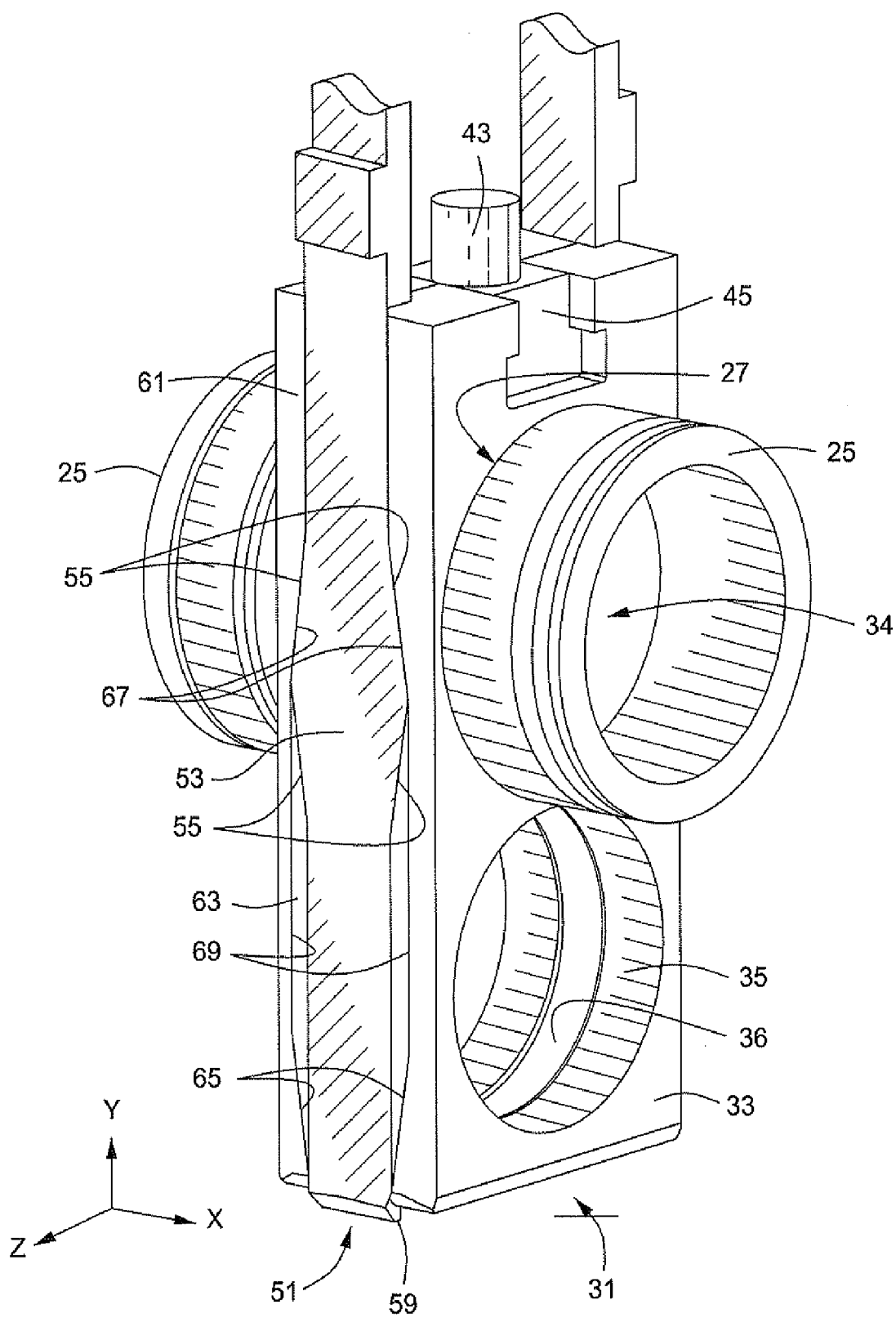
FIG. 4 is an enlarged isometric view of one embodiment of a gate guide and split gate for the gate valve of FIG. 1, shown with the gate in the closed position, and is constructed in accordance with the invention.
Figure 5:
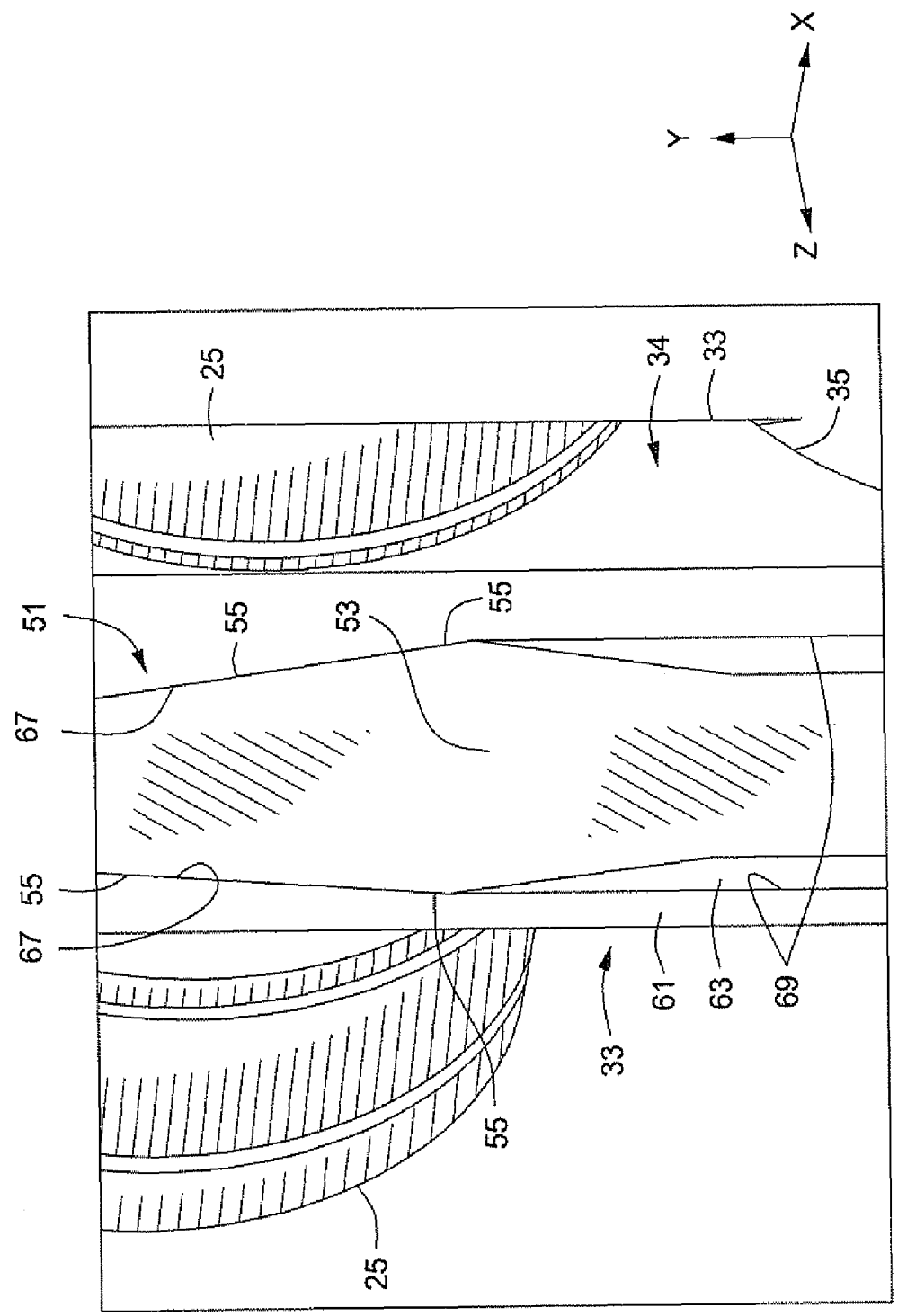
FIG. 5 is a further enlarged isometric view of the gate guide and split gate of FIG. 4, shown with the gate in the closed position, and is constructed in accordance with the invention.
Figure 6:
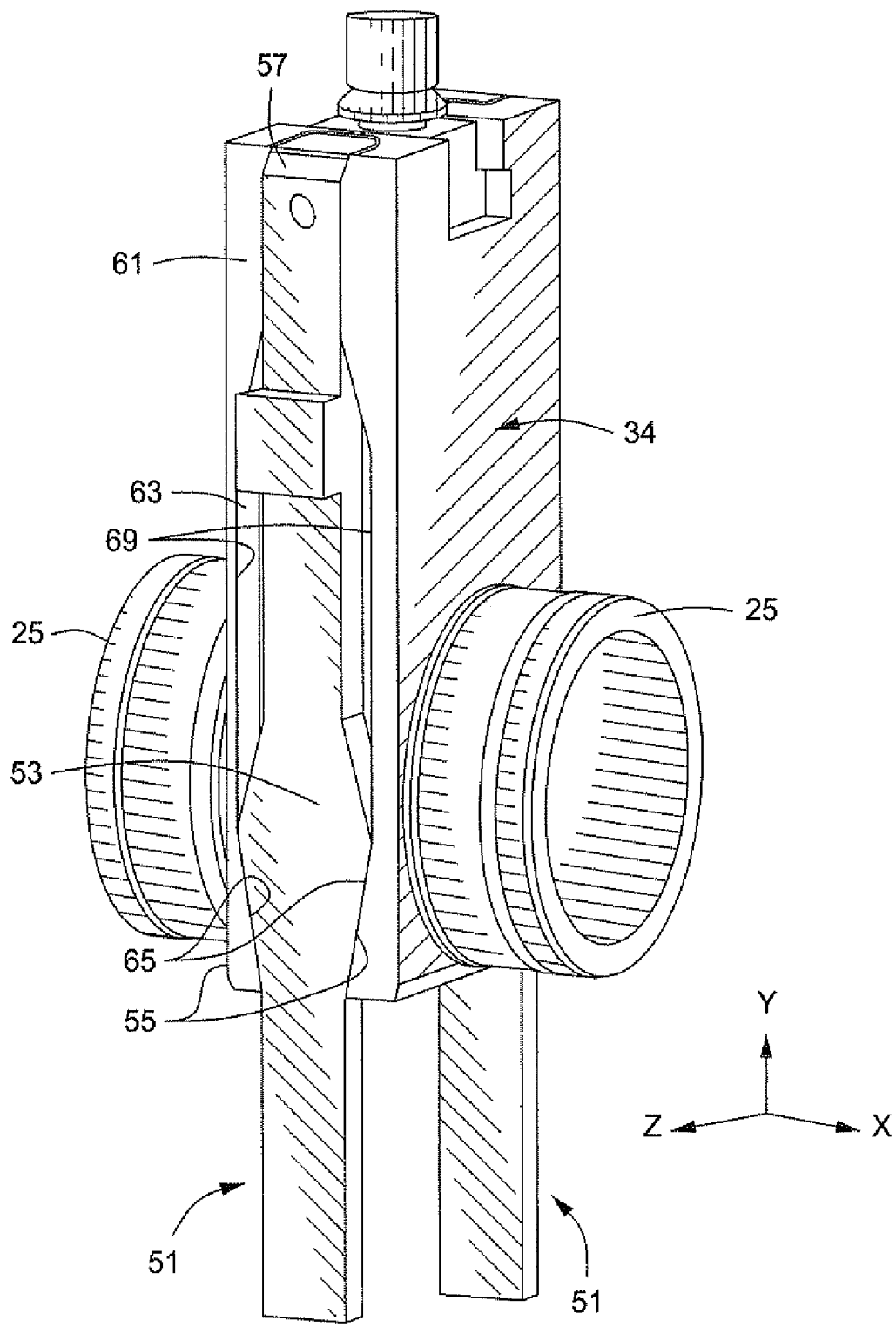
FIG. 6 is an enlarged isometric view of the gate guide and split gate of FIG. 4, shown with the gate in the open position, and is constructed in accordance with the invention.

In one embodiment, the recess 63 has at least two wedges 65, 67 (e.g., two opposing pairs of wedges 65, 67 are shown) for engaging the gate guide 51. Opening wedges 65 bias the pair of gates 33 outward along the fluid axis 21 when the split gate 31 is in the open position (FIG. 6). Closing wedges 67 engage the gate guide 51 to bias the pair of gates 33 outward along the fluid axis 21 when the split gate 31 is in the closed position (FIGS. 4 and 5). The wedges 65, 67 are spaced apart from each other along the valve axis 23 direction. Both wedges 65, 67 may be formed in both lateral sides of each gate 33 in a symmetrical, mirror-imaged configuration.

Each adjacent pair of wedges 65, 67 (i.e., vertically or along the valve axis 23) is spaced axially apart from each other by a rectangular feature 69. The rectangular features 69 provide sufficient axial distance between adjacent pairs of wedges 65, 67 to permit the gates 33 to have some play along the fluid axis 21 such that they can move slightly inward, relative to the open and closed positions.

The invention takes advantage of the positive features of the wedge design but with all the advantages of a much lower torque split gate design. This design permits the valve to be manually operated, rather than hydraulically-actuated like conventional valves. The guide ramps of the invention provide a mechanical contact stress at a level that is needed to isolate debris from entry into the cavity, both in the open and closed positions without the negative consequences of inoperable torques as seen in the wedge style valves. This feature allows the design to be utilized in large bore, high pressure valves that were traditionally not feasible for wedge valves. This feature may be coupled with close tolerance running clearances, pressed metal to metal seats and a silt barrier ring between the two gate segments to provide a reliable valve in abrasive services.

While the invention has been shown or described in only some of its forms, it should be apparent to those skilled in the art that it is not so limited, but is susceptible to various changes without departing from the scope of the invention.

What is claimed is:
1. A split gate valve, comprising:
a body having a fluid aperture extending therethrough along a fluid axis, and a valve axis perpendicular to the fluid axis;
a pair of valve seats mounted in the body along the fluid axis and on opposite sides of the valve axis;
a split gate movably mounted within the body along the valve axis between the valve seats, the split gate having a pair of gates, each with a hole, the split gate being movable between an open position wherein the holes register with the fluid aperture and the valve seats to permit fluid flow therethrough, and a closed position wherein the holes do not register with the fluid aperture and the valve seats to prevent fluid flow therethrough; and
a gate guide located in the body and in contact with the split gate for moving the pair of gates with respect to the valve seats along the fluid axis as the pair of gates moves along the valve axis relative to the gate guide between the open position and the closed position, such that the gate guide forces the pair of gates apart along the fluid axis and into contact with the valve seats in both the open and closed positions, and the pair of gates have axial play along the fluid axis when the split gate is between the open and closed positions.

2. A split gate valve according to claim 1, wherein the gate guide comprises a pair of gate guides, each located along a lateral side of the split gate, such that the gate guides are laterally spaced apart from both the fluid axis and the valve axis.

3. A split gate valve according to claim 1, wherein the split gate has a lateral side located adjacent the body and laterally spaced apart from both the fluid axis and the valve axis, and a recess is formed in the lateral side of the split gate for receiving the gate guide.

4. A split gate valve according to claim 3, wherein the recess comprises a slot extending in a direction of the valve axis, the slot having at least one opening wedge for engaging the gate guide to bias the pair of gates along the fluid axis when the split gate is in the open position, and at least one closing wedge for engaging the gate guide to bias the pair of gates along the fluid axis when the split gate is in the closed position.

5. A split gate valve according to claim 4, wherein the opening and closing wedges are spaced apart from each other along the valve axis direction and are separated by a rectangular feature that provides sufficient separation of the opening and closing wedges to permit axial play between the pair of gates such that the gates can move inward when the gates are not in the open or closed positions.

6. A split gate valve according to claim 4, wherein two pair of the opening and closing wedges are formed in each of the gates in a symmetrical, mirror-imaged configuration.

7. A split gate valve according to claim 1, wherein the gate guide has an open stop for limiting motion of the split gate along the valve axis at the open position, and a closed stop of limiting motion of the split gate along the valve axis at the closed position.

8. A split gate valve according to claim 7, wherein the open stop comprises a shoulder located between the split gate and a cap of the body, and wherein the closed stop comprises a finger that protrudes laterally inward toward the valve axis between the split gate and a lower portion of the body.

9. A split gate valve according to claim 1, wherein the gate guide is stationary within the body and comprises a substantially flat, rectangular member having a single biasing member for engaging the pair of gates.

10. A split gate valve according to claim 9, wherein the single biasing member has tapers to engage a respective one of the gates in the open and closed positions, such that the tapers combine to form upward and downward angled tapers to limit travel of the split gate in a direction of the valve axis.

11. A split gate valve according to claim 1, further comprising a silt barrier located between the pair of gates and coaxially aligned with the holes in the gates, such that each gate is located between one of the valve seats and the silt barrier.

12. A split gate valve according to claim 1, further comprising a hand wheel and stem mounted to the body, extending along and rotatable about the valve axis, and coupled to the split gate for manually moving the split gate between the open and closed positions.

13. A split gate valve, comprising:
  a body having a fluid aperture extending therethrough along a longitudinal fluid axis, and a valve axis perpendicular and transverse to the fluid axis;
  a pair of valve seats mounted in the body along the fluid axis and on opposite sides of the valve axis;
  a split gate movably mounted within the body along the valve axis between the valve seats, the split gate having a pair of gates, each with a hole, the split gate being movable between an open position wherein the holes register with the fluid aperture and the valve seats to permit fluid flow therethrough, and a closed position wherein the holes do not register with the fluid aperture and the valve seats to prevent fluid flow therethrough;
  a silt barrier located between the pair of gates and coaxially aligned with the holes in the gates, such that each gate is located between one of the valve seats and the silt barrier;
  a hand wheel and stem mounted to the body for manually moving the split gate, the hand wheel and stem extending along and rotatable about the valve axis, and coupled to the split gate for manually moving the split gate between the open and closed positions; and
  a gate guide located in the body and in contact with the split gate for moving the pair of gates with respect to the valve seats along the fluid axis as the split gate moves along the valve axis relative to the gate guide between the open position and the closed position, such that the gate guide forces the pair of gates apart along the fluid axis and into contact with the valve seats in both the open and closed positions, and the pair of gates have axial play along the fluid axis when the split gate is between the open and closed positions.

14. A split gate valve according to claim 13, wherein the split gate has a lateral side located adjacent the body and laterally spaced apart from both the fluid axis and the valve axis, and a recess is formed in the lateral side of the split gate for receiving the gate guide.

15. A split gate valve according to claim 14, wherein the recess comprises a generally hexagonal slot extending in a direction of the valve axis, the slot having at least one opening wedge for engaging the gate guide to bias the pair of gates along the fluid axis when the split gate is in the open position, and at least one closing wedge for engaging the gate guide to bias the pair of gates along the fluid axis when the split gate is in the closed position.

16. A split gate valve according to claim 15, wherein the opening and closing wedges are transversely spaced apart from each other along the valve axis direction and are separated by a rectangular feature that provides sufficient separation of the opening and closing wedges to permit axial play between the pair of gates such that the gates can move inward when the gates are not in the open or closed positions.

17. A split gate valve according to claim 15, wherein two pair of the opening and closing wedges are formed in each of the gates in a symmetrical, mirror-imaged configuration.

18. A split gate valve according to claim 13, wherein the gate guide has an open stop for limiting motion of the split gate along the valve axis at the open position, and a closed stop of limiting motion of the split gate along the valve axis at the closed position.

19. A split gate valve according to claim 18, wherein the open stop comprises a shoulder located between the split gate and a cap of the body, and wherein the closed stop comprises a finger that protrudes laterally inward toward the valve axis between the split gate and a lower portion of the body.

20. A split gate valve according to claim 13, wherein the gate guide is stationary within the body and comprises a substantially flat, rectangular member having a single biasing member for engaging the pair of gates, the single biasing member having tapers to engage a respective one of the gates in the open and closed positions, such that the tapers combine to form upward and downward angled tapers to limit travel of the split gate in a direction of the valve axis.

21. A split gate valve according to claim 13, wherein the gate guide comprises a pair of gate guides, each located along a lateral side of the split gate, such that the gate guides are laterally spaced apart from both the fluid axis and the valve axis.

22. A split gate valve, comprising:
- a body having a fluid aperture extending therethrough along a longitudinal fluid axis, and a valve axis perpendicular and transverse to the fluid axis;
- a pair of valve seats mounted in the body along the fluid axis and on opposite sides of the valve axis;
- a split gate movably mounted within the body along the valve axis between the valve seats, the split gate having a pair of gates, each with a hole, the split gate being movable between an open position wherein the holes register with the fluid aperture and the valve seats to permit fluid flow therethrough, and a closed position wherein the holes do not register with the fluid aperture and the valve seats to prevent fluid flow therethrough;
- a silt barrier located between the pair of gates and coaxially aligned with the holes in the gates, such that each gate is located between one of the valve seats and the silt barrier;
- a hand wheel and stem mounted to the body for manually moving the split gate, the hand wheel and stem extending along and rotatable about the valve axis, and coupled to the split gate for manually moving the split gate between the open and closed positions;
- a gate guide located in the body and in contact with the split gate for moving the pair of gates with respect to the valve seats along the fluid axis, such that the gate guide forces the pair of gates apart along the fluid axis and into contact with the valve seats in both the open and closed positions, and the pair of gates have axial play along the fluid axis when the split gate is between the open and closed positions;
- the split gate having a lateral side located adjacent the body and laterally spaced apart from both the fluid axis and the valve axis, and a recess is formed in the lateral side of the split gate for receiving the gate guide, and the recess comprises a slot extending in a direction of the valve axis, the slot having at leak one opening wedge for engaging the gate guide to bias the pair of gates along the fluid axis when the split gate is in the open position, and at least one closing wedge for engaging the gate guide to bias the pair of gates along the fluid axis when the split gate is in the closed position.

23. A split gate valve according to claim 22, wherein the opening and closing wedges are transversely spaced apart from each other along the valve axis direction and are separated by a rectangular feature that provides sufficient separation of the opening and closing wedges to permit axial play between the pair of gates such that the gates can move inward when the gates are not in the open or closed positions, and wherein two pair of the opening and closing wedges are formed in each of the gates in a symmetrical, mirror-imaged configuration.

24. A split gate valve according to claim 22, wherein the gate guide has an open stop for limiting motion of the split gate along the valve axis at the open position, and a closed stop of limiting motion of the split gate along the valve axis at the closed position, and wherein the open stop comprises a shoulder located between the split gate and a cap of the body, and wherein the closed stop comprises a finger that protrudes laterally inward toward the valve axis between the split gate and a lower portion of the body.

25. A split gate valve according to claim 22, wherein the gate guide is stationary within the body and comprises a substantially flat, rectangular member having a single biasing member for engaging the pair of gates, the single biasing member having tapers to engage a respective one of the gates in the open and closed positions, such that the tapers combine to form upward and downward angled tapers to limit travel of the split gate in a direction of the valve axis; and
- the gate guide comprises a pair of gate guides, each located along a lateral side of the split gate, such that the gate guides are laterally spaced apart from both the fluid axis and the valve axis.

* * * * *